United States Patent [19]

Itsubo et al.

[11] 4,392,581

[45] Jul. 12, 1983

[54] CONTAINER CLOSURE HAVING A LINER AND METHOD FOR ITS PRODUCTION

[75] Inventors: Junichi Itsubo, Hiratsuka; Fumio Mori, Yokohama; Hideki Sato, Hiratsuka, all of Japan

[73] Assignee: Japan Crown Cork Co. Ltd., Tokyo, Japan

[21] Appl. No.: 395,910

[22] Filed: Jul. 7, 1982

[30] Foreign Application Priority Data

Jul. 9, 1981 [JP] Japan ................................ 56/106252

[51] Int. Cl.³ ....................... B65D 53/00; B65D 53/04
[52] U.S. Cl. ..................................... 215/348; 215/349; 428/64; 428/522; 524/312
[58] Field of Search ................. 264/268; 215/348, 349; 428/64, 522; 524/312

[56] References Cited

U.S. PATENT DOCUMENTS 3,032,826  5/1962  Brillinger ............................. 264/268
3,907,953  9/1975  Wheeler ............................... 215/348
4,312,824  1/1982  Mori et al. .......................... 264/268

FOREIGN PATENT DOCUMENTS 746233  3/1956  United Kingdom ................ 524/312

*Primary Examiner*—William J. Van Balen
*Attorney, Agent, or Firm*—Sherman & Shalloway

[57] ABSTRACT

A container closure having a sealing liner comprising a vinyl chloride-type resin is provided which has excellent sealing properties, openability and hygienic characteristics. The liner is composed of a composition, especially a plastisol composition, comprising 100 parts by weight of the vinyl chloride-type resin and 35 to 200 parts by weight of a mixed fatty acid ester of glycerin derived from glycerin, at least one saturated or unsaturated fatty acid component having an even number of carbon atoms between 6 and 24 and at least one acetic or butyric acid component, such as a diacetyl higher fatty acid glyceride. A method for producing the container closure is also provided.

8 Claims, No Drawings

CONTAINER CLOSURE HAVING A LINER AND METHOD FOR ITS PRODUCTION

BACKGROUND OF THE INVENTION

1. Field of the Invention

This invention relates to a container closure having a liner and a method for its production. More specifically, it pertains to a container closure with a liner which has excellent sealing properties, openability and hygienic characteristics.

2. Description of the Prior Art

The provision of some sealing material is required in container closures such as crown caps and other types of caps in order to ensure sealing of the mouth of a container such as a bottle. A plastisol composed of vinyl chloride-type resin particles dispersed in a plasticizer has been widely used as a liner-forming material for container closures because it can be applied in a flowable condition to a closure of any shape and can be easily formed into a sealing liner by heat gellation, and it obviates the troublesome operation of producing liners by stamping and applying them one by one to closures which is required in the case of using disc-like packings as liners.

Heretofore, adipate plasticizers such as dioctyl adipate or phthalate plasticizers such as dioctyl phthalate and dibutyl phthalate have been widely used in the plastisol. The deleterious effect of these plasticizers on foods and drinks in containers remains a problem, and it is much desired to develop a plastisol which can replace the conventional one.

SUMMARY OF THE INVENTION

We have now found that a plastisol as a material for forming liners of container closures can be provided by dispersing particles of a vinyl chloride-type resin in a mixed fatty acid ester of glycerin derived from glycerin, at least one saturated or unsaturated fatty acid component having an even number of carbon atoms between 6 and 24, and at least one acetic or butyric acid component; that this mixed fatty acid glyceride becomes a dispersing medium having an excellent dispersing action and an excellent dispersion stabilizing action on the vinyl chloride resin particles; and that a sealing liner prepared from this plastisol has excellent plasticity and lubricity and can give a container closure with a liner which has excellent sealing properties, openability and hygienic characteristics.

It is an object of this invention to provide a container closure having a vinyl chloride-type resin liner which has an excellent combination of sealing properties, openability and hygienic characteristics, and a method for producing the aforesaid container closure.

Another object of this invention is to provide a container closure having a liner formed from a plastisol containing a mixed fatty acid glyceride having the actions of a plasticizer, lubricant and dispersant.

According to this invention, there is provided a container closure having a sealing liner comprising a vinyl chloride-type resin, said liner being composed of a composition comprising 100 parts by weight of the vinyl chloride-type resin and 35 to 200 parts by weight of a mixed fatty acid ester of glycerin derived from glycerin, at least one saturated or unsaturated fatty acid component having an even number of carbon atoms between 6 and 24 and at least one acetic and/or butyric acid component.

According to this invention, there is also provided a method for producing a container closure having a liner, which comprises applying to the inside of a container closure a plastisol comprising 100 parts by weight of particles of a vinyl chloride-type resin and 35 to 200 parts by weight of a mixed fatty acid ester of glycerin derived from glycerin, at least one saturated or unsaturated fatty acid component having an even number of carbon atoms between 6 and 24 and at least one acetic and/or butyric acid component, and gelling the plastisol to a liner form.

DETAILED DESCRIPTION OF THE INVENTION

The mixed fatty acid esters of glycerin used in this invention correspond to fatty acid glycerides which are among emulsifiers officially approved as food additives. Before the present invention, however, it was quite unknown to use a composition, particularly a plastisol composition, comprising such a mixed fatty acid glyceride and a vinyl chloride-type resin as a material for forming a sealing liner in container closures.

The mixed fatty acid glyceride used in this invention bears a characteristic chemical structure in that it has both a higher fatty acid ester group and a lower fatty acid (acetic or butyric acid) ester group bonded to the glycerin skeleton. Because of this chemical structure, the mixed fatty acid glyceride used in this invention has a plasticizing action comparable to dioctyl adipate and dioctyl phthalate (DOP) conventionally used in sealing liners, and therefore can impart compressibility, elasticity, cushioning property and gas barrier property, the properties required of sealing liners, to a vinyl chloride-type resin liner. It can also impart lubricating properties, thereby rendering a container closure easily openable.

One problem with a container closure having a plastic liner is that when a bottle sealed with it is to be opened, the revolving torque required for opening increases unusually. No exact cause of this increase in torque is known, but it is presumably because during storage of the sealed bottle, the surface of the liner gradually decreases in lubricity, and solid sticky materials (sugar cement, etc.) ascribable to sugar, etc. in a drink contained in the bottle deposit at the contacting portion between the sealing liner and a bottle mouth. This problem also exists in the case of crown caps, and in the absence of slip between the bottle mouth and the liner during opening, the bottle mouth itself will be broken.

As stated hereinabove, the mixed fatty acid glyceride used in this invention has an excellent plasticizing action on vinyl chloride-type resins, and a vinyl chloride-type resin liner containing it shows a long duration of action and makes it possible to keep the increasing tendency of the closure opening torque of a sealed bottle at a much lower level than that in the prior art.

Furthermore, because of the aforesaid chemical structure, the mixed fatty acid glyceride specified in this invention is water-insoluble and has a much reduced tendency to extraction by beverages, etc. Thus, it is also excellent in regard to the retention of the flavor of contents and hygienic characteristics. As an additional advantage, since the mixed fatty acid glyceride used in this invention is approved officially as a food additive, it is safe even when it gets mixed with beverages or other contents.

Many other unexpected advantages can be achieved by using the mixed faty acid glyceride and vinyl chloride-type resin particles as a plastisol for liner formation. Specifically, the fatty acid glyceride has an excellent dispersing action as can be seen from the fact that it is officially approved as an emulsifier or surface-active agent for addition to food. A plastisol containing it has outstandingly good dispersion stability. What is most important, a plastisol containing this mixed fatty acid glyceride, by comparison on the same quantitative level of plasticizer, has a lower viscosity than known plastisol compositions containing DOP and the like, and therefore, it has the operational advantage that it is very easy to inject the plastisol from a nozzle into a container closure and coat or spread the plastisol in the container closure. Furthermore, the plastisol used in this invention undergoes much less change in viscosity with time than conventional liner-forming plastisols, and therefore is very advantageous in storage stability (pot life) or workability. Table 1 below shows the relation between the number of days elapsed and dynamic viscosity (centipoises measured by a B-type viscometer), which was obtained when plastisols prepared by incorporating 60 parts by weight of diacetyl monolauryl glyceride (a typical plasticizer specified in this invention) and known DOP respectively in 100 parts by weight of a vinyl chloride-type resin were each stored at 30° C.

TABLE 1

|  | Viscosity in cps | | | |
|---|---|---|---|---|
|  | Days elapsed | | | |
|  | 1 | 2 | 3 | 6 |
| Invention | 1500 | 1600 | 1650 | 1700 |
| DOP | 3100 | 4200 | 4700 | 5200 |

An additional advantage can be achieved when the plastisol specified in this invention is used for the formation of a foamed liner. With a conventional liner-forming foamable plastisol, the density of a foamed liner produced from it depends very greatly upon the foaming temperature. Accordingly, a strict control of temperature is required in order to obtain a liner having the desired density (expansion ratio), and it is difficult to produce a foamed liner having a certain fixed density. In contrast, when a blowing agent is included in the plastisol specified in this invention and the mixture is used for the formation of a foamed liner, the density of the foamed liner depends less upon temperature, and foamed liners having a certain fixed density can be produced without a strict control of temperature.

The higher fatty acid component used in this invention may be one or more of caproic acid, caprylic acid, capric acid, lauric acid, myristic acid, palmitic acid, stearic acid, arachidic acid, behenic acid, lignoceric acid, oleic acid, linolic acid, linolenic acid, erucic acid, etc. Mixed fatty acids such as soybean oil fatty acid, beef tallow fatty acid, coconut oil fatty acid, and palm oil fatty acid may also be used conveniently as the higher fatty acid component. The lower fatty acid component used in the invention is acetic acid, butyric acid or both.

The mixed fatty acid ester of glycerin used in this invention has a chemical structure of the following formula

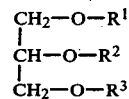

wherein at least one of $R^1$, $R^2$ and $R^3$ is an acyl group derived from the aforesaid higher fatty acid, at least one of $R^1$, $R^2$ and $R^3$ is an acyl group derived from acetic or butyric acid, and one of $R^1$, $R^2$ and $R^3$ may be a hydrogen atom.

Examples of preferred esters of the above formula are diacetyl monolauryl glyceride, diacetyl stearyl glyceride, diacetyl palmityl glyceride, dibutyryl monolauryl glyceride, and monobutyryl monolauryl glyceride. Glycerides having two acetyl groups and one acyl group from the higher fatty acid are most convenient for the objects of this invention.

The mixed fatty acid glyceride can be easily obtained by esterifying glycerin with the corresponding fatty acids in a customary manner. The fatty acids may be used in the reaction in the form of a free acid or an acid halide or anhydride.

Examples of the vinyl chloride-type resin used in this invention include a homopolymer of vinyl chloride, and copolymers of vinyl chloride with a minor proportion of a comonomer such as vinyl acetate, vinylidene chloride, styrene, acrylic acid esters, methacrylic acid esters, and butadiene. There is no particular restriction on the average degree of polymerization of these vinyl chloride-type resins, and generally, those having an average degree of polymerization of from 500 to 3000 are convenient. These vinyl chloride-type resins can be used to achieve the objects of this invention whether they are in the form of relatively fine particles obtained by emulsion polymerization or relatively coarse particles obtained by suspension polymerization or a mixture of both.

It is also essential in this invention that the mixed fatty acid ester of glycerin be used in an amount of 35 to 200 parts by weight, preferably 50 to 150 parts by weight, per 100 parts by weight of the vinyl chloride-type resin. If the amount of the ester is below the above-specified lower limit, it is difficult to achieve the aforesaid advantages of the invention. If, on the other hand, it is above the specified upper limit, the resulting resin composition for liner formation becomes excessively soft or has excessively reduced mechanical strength, and, therefore, does not suit the objects of this invention.

The vinyl chloride-type resin composition for liner formation used in this invention may optionally contain known additives such as stabilizers, fillers, pigments and blowing agents in accordance with known recipes. Other plasticizers or lubricants known per se may also be incorporated in amounts which do not deviate from the spirit and scope of the invention. For example, there can be used such stabilizers as metal soaps, organotin compounds, and organic phosphate esters, such fillers as calcium carbonate, finely divided silica, magnesium carbonate, talc and fired clay, such pigments as titanium white and carbon black, and such blowing agents as azodicarbonamide and 4,4-oxybis(benzenesulfonyl)-hydrazide. Examples of the other plasticizers which may be used in combination include epoxy-type plasticizers such as epoxidized soybean oil and epoxidized linseed oil, and polyester-type plasticizers such as polypropylene sebacate. Examples of the lubricants are microcrystalline wax, paraffin wax, polyethylene wax, silicone oils, and fatty acid amide-type plasticizers.

In the present invention, the vinyl chloride-type resin composition for liner formation is especially preferably used in the form of a plastisol. The plastisol can be easily obtained by dispersing particles of the vinyl chloride-type resin in the mixed fatty acid glyceride as a dispersing medium, if required together with the aforesaid additives. The mixed fatty acid glyceride may be a solid or wax at room temperature when the number of carbon atoms of the higher fatty acid is 18 or more and the acid is saturated. Such a solid or waxy ester, too, can easily be used to form the liner-forming plastisol by heating it to a temperature above its melting point.

A recipe for a preferred plastisol composition is as follows:

| Ingredient | Amount (parts by weight) |
| --- | --- |
| Vinyl chloride-type resin | 100 |
| Glyceride plasticizer | 50–150 |
| Blowing agent | 0–2 |
| Stabilizer | 0.5–4 |
| Lubricant | 1–5 |
| Filler | 1–10 |
| Pigment | 0–5 |

As stated hereinabove, the plastisol composition used in this invention has a relatively low viscosity as compared with known plastisols. It is sometimes desirable, however, to increase the viscosity of the plastisol in order to impart shape retention to the liner formed by a spin lining method, etc. For this purpose, the viscosity of the plastisol composition may be adjusted by using 10 to 60% by weight, preferably 25 to 50% by weight, based on the mixed fatty acid glyceride, of another plasticizer, especially an epoxy-type or polyester-type plasticizer.

The plastisol is applied to that part of a closure shell at which sealing with respect to the mouth of a container is required, by injecting it into the shell while rotating the shell. If required, the plastisol may be pressed by a heated former to obtain a desired liner form. The plastisol applied to the closure shell is then heated to a gel and as required, foamed to give an unfoamed or foamed liner.

When producing a foamed liner, its apparent density is desirably adjusted to a range of 0.4 to 1.2.

A closure shell can be easily produced by subjecting a coated metal blank to a known means such as blanking press forming and score formation. Non-treated steel, surface-treated steel, and light metals such as aluminum, in a sheet or foil form, may be used as the metal blank from which to produce the closure shell. The surface-treated steel may be obtained by subjecting a steel substrate to chemical treatment such as treatment with phosphoric acid or chromic acid, electrolytic treatment in chromic acid, electroplating treatment such as tin plating, zinc plating chrome plating, and molten plating treatment such as molten aluminum plating and molten tin plating. At least that surface of the metal blank which is to become the inside surface of a closure is coated with a protective paint. Examples of suitable paints used for this purpose include thermosetting resin paints such as phenol-formaldehyde resin, furan-formaldehyde resin, xylene-formaldehyde resin, ketone-formaldehyde resin, urea-formaldehyde resin, melamine-formaldehyde resin, alkyd resin, unsaturated polyester resins, epoxy resins, maleimide resin, triallyl cyanurate resin, thermosetting acrylic resins, silicone resins and oleoresins, and thermoplastic resin paints such as vinyl chloride/vinyl acetate copolymer, a saponification product of vinyl chloride/vinyl acetate copolymer, vinyl chloride/maleic acid copolymer, vinyl chloride/maleic acid/vinyl acetate copolymer, acrylic resins and saturated polyester resins. These protecting paints may be used singly or in combination of two or more.

Preferably, under heat, these paints have adhesion to the resin constituting the liner. When the resin constituting the liner is a vinyl chloride-type resin, paints containing a vinyl chloride-type resin or an acrylic resin are especially preferred.

The amount of the plastisol to be applied is generally such that when applied to the sealing portion, it has a thickness of 0.3 to 4 mm, although it differs depending upon the shape of the liner, and upon whether it is foamed or unfoamed. Gellation of the plastisol may conveniently be performed by heating it at a temperature of 160° to 280° C. for a period of 10 seconds to 3 minutes.

It should be understood that the container closure of this invention having a liner can be produced also by kneading a composition containing the vinyl chloride-type resin and the mixed fatty acid glyceride, extruding the kneaded composition in the form of pellets, a preform, etc. into a closure shell, and molding it by a plunger or the like, and in this case, too, the aforesaid many advantages can be achieved.

It is also possible to mold the plastisol composition into such a form as a packing outside a container closure, and bond it to the closure shell by using an adhesive or by applying heat.

The following examples illustrate the present invention more specifically.

EXAMPLE 1

A tin plate, 0.23 mm thick, was coated with an epoxy-phenol paint as a primer and then a vinyl phenol-type paint as a paint for bonding a liner material thereto. (The coatings were respectively baked for 10 minutes at a temperature of 160° to 220° C.) Caps having a diameter of 52 mm were produced from the coated tin plate by blanking so that the coated side of the tin plate became the inside surfaces of the caps. The caps were threaded to produce screw cap shells. A liner material having the composition specified by this invention (100 parts by weight of a vinyl chloride resin, 73 parts by weight of diacetyl monolauryl glyceride as a plasticizer, 1.5 parts by weight of paraffin wax as a lubricant, 0.4 part by weight of azodicarbonamide as a blowing agent, 5 parts by weight of titanium oxide as a filler and 3.5 parts by weight of a stabilizer) and a liner material for comparison (having the same composition as the liner of the invention except 73 parts by weight of dioctyl phthalate was incorporated instead of the glyceride plasticizer of the invention) were respectively formed into plastisols. Each of them was applied in an amount of 1.2 g in ring form to each of the screw cap shells, and immediately then baked at 220° C. for 1 minute in a gas oven to produce cap samples of the invention and the comparison.

Using these samples, the following cap opening torque test and sealing test were conducted. The results are shown in Table 2.

Cap opening torque test and sealing test

Hot water at 100° C. was filled into each of glass bottles having a capacity of 200 cc so that the head space measured 10 cc. The glass bottles were then capped with the sample caps by applying a clamping torque of 25 kg·cm. The capped bottles were allowed to stand at 2° C. and 40° C. respectively for 1 day, 2 weeks and one month, and changes in the opening torque value and sealing property (the degree of vacuum) of the bottles at the end of the indicated periods were measured on ten samples (n=10) in each run.

TABLE 2

| Standing temp. | Cap | Cap opening torque test (kg.cm) | | | Sealing test (cmHg) | | |
|---|---|---|---|---|---|---|---|
| | | 1 day later | 2 weeks later | 1 month later | 1 day later | 2 weeks later | 1 month later |
| 2° C. | Invention | 54.2 | 50.1 | 48.7 | 42.2 | 42.2 | 42.4 |
| | Comparison | 64.0 | 65.0 | 65.0 | 42.6 | 41.4 | 41.7 |
| 40° C. | Invention | 27.8 | 25.3 | 23.4 | 34.5 | 33.6 | 31.9 |
| | Comparison | 37.8 | 35.8 | 32.4 | 35.0 | 32.4 | 31.0 |

Note
1. The indicated values are averages of the measured values of 10 samples.
2. The (kg·cm) values were obtained by measurement at the indicated standing temperatures.

EXAMPLE 2

A tin plate, 0.24 mm thick, was coated with an epoxy phenol-type paint as a primer and then an acrylic paint as a paint for bonding a liner material thereto. (The coatings were respectively baked at 160° to 220° C. for 10 minutes.) Caps having a diameter of 42 mm were produced from the coated tin plate by blanking so that the coated side of the plate became the inside surfaces of the caps. The caps were threaded to form screw cap shells. A liner material having the composition in accordance with this invention (consisting of 100 parts by weight of a vinyl chloride resin, 40 parts by weight of diacetyl monolauryl glyceride and 40 parts by weight of epoxidized soybean oil as plasticizers, 1 part by weight of oleinamide as a lubricant, 0.5 parts by weight of azodicarbonamide as a blowing agent, 1 part by weight of titanium oxide as a filler and 2 parts by weight of a stabilizer) and a liner material for comparison (having the same composition as the liner of the invention except that 80 parts by weight of dioctyl phthalate was incorporated instead of the plasticizers used in the liner of the invention) were respectively formed into plastisols. Each of them was applied in an amount of 1.0 g in ring form to each of the screw cap shells, and immediately then baked at 220° C. for 1 minute in a gas oven to produce cap samples of the invention and the comparison. The cap samples were subjected to a cap opening torque test and a sealing test in the same way as in Example 1 except that the clamping torque in capping was changed to 20 kg·cm. The results are shown in Table 3.

TABLE 3

| Standing temp. | Cap | Cap opening torque test (kg · cm) | | | Sealing test (cmHg) | | |
|---|---|---|---|---|---|---|---|
| | | 1 day later | 2 weeks later | 1 month later | 1 day later | 2 weeks later | 1 month later |
| 2° C. | Invention | 23.8 | 25.0 | 26.6 | 43.4 | 43.0 | 42.0 |
| | Comparison | 21.0 | 28.4 | 35.3 | 43.6 | 42.5 | 41.3 |
| 40° C. | Invention | 14.5 | 16.4 | 18.2 | 42.0 | 41.8 | 40.8 |
| | Comparison | 16.2 | 18.3 | 26.4 | 42.3 | 40.7 | 40.0 |

Note
The same as the footnote to Table 2.

EXAMPLE 3

An aluminum plate (JIS No. 5000), 0.25 mm thick, was coated with an epoxy phenol-type paint as a primer and then an acrylic paint as a paint for bonding a liner material thereto. (The coatings were respectively baked at 160° to 220° C. for 10 minutes). The coated aluminum plate was blanked to produce caps having a diameter of 38 mm, and the caps were rolled to form PP cap shells. A liner material having the composition specified in this invention (consisting of 100 parts by weight of a vinyl chloride resin, 65 parts by weight of diacetyl monolauryl glyceride as a plasticizer, 0.7 part by weight of erucamide as a lubricant, 1 part by weight of titanium oxide as a filler and 2 parts by weight of a stabilizer) and a liner material for comparison (having the same composition as the liner material of the invention except that 65 parts by weight of dioctyl phthalate was incorporated instead of the plasticizer used in the invention) were respectively formed into plastisols. Each of the plastisols was applied in an amount of 0.8 g to the entire inner bottom surface of each of the PP cap shells by a spin lining method, and immediately then baked in a gas oven at 220° C. for 1 minute to produce PP cap samples of the invention and the comparison. The cap samples were subjected to a cap opening torque test and a sealing test in the following manner, and the results obtained are shown in Table 4.

Cap opening torque test and sealing test

One liter of cola at 4° C. having a gas volume of 3.7 Vol (at 15° C.) was filled into each of glass bottles having a capacity of 1 liter, and the PP cap samples of the invention and the comparison were sealed by roll-on on the bottles at a head pressure of 330 kg/bottle. After standing at 2° C. and 40° C. respectively for 1 day, 2 weeks and 1 month, changes in the cap opening torque and sealing property (duration of pressure resistance) were measured using 10 samples in each run.

TABLE 4

| Standing temp. | Cap | Cap opening torque test (kg · mc) | | | Sealing test (vol.) | | |
|---|---|---|---|---|---|---|---|
| | | 1 day later | 2 weeks later | 1 month later | 1 day later | 2 weeks later | 1 month later |
| 2° C. | Invention | 15.0 | 17.2 | 15.0 | 3.70 | 3.65 | 3.66 |
| | Comparison | 20.3 | 25.0 | 35.0 | 3.73 | 3.63 | 3.60 |
| 40° C. | Invention | 10.4 | 12.0 | 13.4 | 3.68 | 3.63 | 3.60 |
| | Comparison | 15.8 | 28.0 | 37.2 | 3.68 | 3.62 | 3.60 |

Note
1. The indicated values are averages of the measured values of 10 samples.
2. The torque was measured at the indicated standing temperatures, and the sealing property was measured at 15° C.

EXAMPLE 4

A liner material having the composition specified in this invention in Example 1 and a liner material having the composition of the comparison in Example 1 were respectively formed into plastisols and were applied in an amount of 1.2 g in ring form to each of screw cap shells produced in the same way as in Example 1 except that the paints were not coated. Immediately then, the liner materials applied were baked for 1 minute at each of the temperatures indicated in Table 5 in a gas oven to produce cap samples of the invention and the comparison. The liner materials were peeled off from the caps, and the densities of five sample liners in each run were measured so as to determine foaming stability at the baking temperatures. The results are shown in Table 5.

TABLE 5

| | Baking temperature (°C.) | | | |
|---|---|---|---|---|
| | 180 | 200 | 220 | 240 |
| Invention | 0.95 | 0.70 | 0.60 | 0.58 |
| Comparison | 1.10 | 0.85 | 0.63 | 0.55 |

Note
The indicated values are averages of the measured values of 5 samples.

EXAMPLE 5

A vinyl chloride sol in accordance with this invention consisting of 100 parts by weight of vinyl chloride resin, 60 parts by weight of acetyl fatty acid glyceride as a plasticizer, 2 parts by weight of titanium oxide as a filler, 1 part by weight of azodicarbonamide as a blowing agent, 0.5 part by weight of oleinamide as a lubricant, 3 parts by weight of a silicone oil as a lubricant and 2 parts by weight of a stabilizer was prepared, and for comparison, a vinyl chloride sol having the same composition as above except that dioctyl phthalate was used instead of the above plasticizer was prepared. Each of the resulting vinyl chloride sols was applied in an amount of 0.8 g to the entire inner surface of each of PP cap shells having a diameter of 38 mm, immediately then baked in a gas oven at 230° C. for 1 minute, and then aged at room temperature for one week. In order to determine the effect of sugar cement on the resulting PP caps, they were subjected to a cap opening torque test in the following manner.

Cola was filled into bottles having a capacity of 1 liter to cause it to adhere to the mouth portion of each bottle. The bottles were then sealed under a head pressure of 330 kg/bottle, and to permit easy deposition of sugar cement, the sealed bottles were allowed to stand at a humidity of 20%. The standing temperature was varied as shown in Table 6, and changes with time in cap opening torque were examined. As comparison 2, a liner having the same composition as the aforesaid comparison was used except that the silicone oil was not added. The results are shown in Table 6.

TABLE 6

| Standing conditions | Cap | Cap opening torque test (kg · cm) | | |
|---|---|---|---|---|
| | | 1 day later | 2 weeks later | 1 month later |
| 2° C. 20% (humidity) | Invention | 18.0 (21/16) | 22.2 (25/20) | 23.6 (26/19) |
| | Comparison 1 | 19.4 (26/14) | 35.3 (45/30) | 45.9 (60/35) |
| | Comparison 2 | 22.0 (29/15) | 40.8 (53/35) | (above 60/above 60) |
| 40° C. 20% (humidity) | Invention | 12.2 (14/10) | 14.8 (17/12) | 15.6 (19/12) |
| | Comparison 1 | 13.6 (16/10) | 29.3 (38/21) | 41.0 (58/33) |
| | Comparison 2 | 15.0 (18/13) | 36.0 (46/27) | (above 60/above 60) |

Note
1. Comparison 1: DOP as plasticizer and containing silicone. Comparison 2: DOP as plasticizer and containing no silicone.
2. The indicated torque values in each run show average (maximum/minimum). This way of data listing is employed because the effect of sugar cement increases the range of the torque.

What we claim is:

1. A container closure having a sealing liner comprising a vinyl chloride-type resin, said liner being composed of a composition comprising 100 parts by weight of the vinyl chloride-type resin and 35 to 200 parts by weight of a mixed fatty acid ester of glycerin derived from glycerin, at least one saturated or unsaturated fatty acid component having an even number of carbon atoms between 6 and 24 and at least one acetic and/or butyric acid component.

2. The container closure of claim 1 wherein the mixed fatty acid ester of glycerin is a diacetyl higher fatty acid glyceride.

3. The container closure of claim 1 wherein the amount of the mixed fatty acid ester of glycerin is 50 to 150 parts by weight.

4. The container closure of claim 1 wherein said liner is composed of a plastisol of the vinyl chloride-type resin dispersed in the mixed fatty acid ester of glycerin.

5. The container closure of claim 4 wherein the plastisol consists of 100 parts by weight of the vinyl chloride-type resin, 50 to 150 parts by weight of the mixed fatty acid ester of glycerin as a plasticizer, 0 to 2 parts by weight of a blowing agent, 0.5 to 3 parts by weight of a stabilizer, 1 to 5 parts by weight of a lubricant, 1 to 10 parts by weight of a filler and 0 to 5 parts by weight of a pigment.

6. The container closure of claim 1 wherein the liner further contains 10 to 60% by weight, based on the mixed fatty acid ester of glycerin, of an epoxy-type plasticizer or a polyester-type plasticizer.

7. The container closure of claim 1 wherein the liner is foamed so that its apparent density is kept at 0.4 to 1.2.

8. A method for producing a container closure having a liner, which comprises applying to the inside of a container closure a plastisol comprising 100 parts by weight of particles of a vinyl chloride-type resin and 35 to 200 parts by weight of a mixed fatty acid ester of glycerin derived from glycerin, at least one saturated or unsaturated fatty acid component having an even number of carbon atoms between 6 and 24 and at least one acetic and/or butyric acid component, and gelling the plastisol to a liner form.

* * * * *